(12) United States Patent
Stawitz et al.

(10) Patent No.: US 6,465,659 B2
(45) Date of Patent: Oct. 15, 2002

(54) PROCESS FOR PREPARING ASYMMETRICAL METHINE DYES

(75) Inventors: Josef-Walter Stawitz, Odenthal (DE); Karl-Heinz Reinhardt, Monheim (DE); Christoph Thiebes, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/090,684

(22) Filed: Mar. 5, 2002

(65) Prior Publication Data

US 2002/0128489 A1 Sep. 12, 2002

(30) Foreign Application Priority Data

Mar. 9, 2001 (DE) ......................... 101 11 731

(51) Int. Cl.$^7$ ................. C07D 403/06; C09B 69/00
(52) U.S. Cl. ................. 548/364.7; 8/638
(58) Field of Search ................. 548/364.7; 8/638

(56) References Cited

U.S. PATENT DOCUMENTS 5,136,045 A    8/1992   Nakamatsu et al. ..... 548/364.7

FOREIGN PATENT DOCUMENTS

DE    1154894    9/1963
DE    1172387    6/1964

OTHER PUBLICATIONS

Angew. Chem. (month unavailable) 1999, 111, No. 11, pp. 1753–1757, Frank Würthner, Rüdiger Sens, Karl–Heinz Etzbach und Günther Seybold, Design, Synthese und Auswertung einer Farbstoffbibliothek: glasbildende und im Festkörper lumineszierende Merocyanine für funktionelle Materialien.

Dyes und Pigments, 24 (month unavailable) 1994, pp. 185–204, Claudia Reidlinger, Renate.

Dworczak, Walter M.F. Fabian and Hans Junek, Structure-Color Correlations of Penta– and Heptamethines. Syntheses with Nitriles XCIV.

*Primary Examiner*—Robert W. Ramsuer
(74) *Attorney, Agent, or Firm*—Joseph C. Gil; Richard E. L. Henderson

(57) ABSTRACT

Reaction of pyrazolones and methyleneindolines with orthoformic esters is an advantageous one-step process for preparing asymmetrical methine dyes.

7 Claims, No Drawings

PROCESS FOR PREPARING ASYMMETRICAL METHINE DYES

BACKGROUND OF THE INVENTION

The invention relates to a novel process for preparing asymmetrical methine dyes, to methine dye mixtures, to a process for their preparation, and to their use for mass coloration of organic polymeric materials.

Asymmetrical methine dyes, for example, the asymmetrical methine dye in Example 1 of this application, are very useful for mass coloration of plastics. Dyes of this kind are prepared, for example, by condensing the corresponding pyrazolonealdehyde with the corresponding 2-methyleneindolenine (cf. DE-B 1,154,894).

Alternatively, asymmetrical methine dyes may also be prepared by condensing the corresponding 2-methyleneindolenine-ω-aldehyde with pyrazolone (cf. DE-B 1,172,387 and EP-A 419,110).

F. Würthner, R. Sens, K. -H. Etzbach, and G. Seybold, Angew. Chemie, 1999, 111 No 11, pp. 1753 to 1757, utilize, for example, acetic anhydride solvent for preparing specific merocyanines.

C. Reidlinger, R. Dworczak, W. M. F. Fabian, and H. Junck, Dyes and Pigments 24 (1994) pages 185 to 204, utilize not only ethyl acetate but also acetonitriles as a solvent in the preparation.

The approaches described above include the disadvantage that at least one of the two reactant components, preferably the aldehyde, must first be prepared in a further step.

SUMMARY OF THE INVENTION

There has now been surprisingly found a process for preparing compounds of the formula (I)

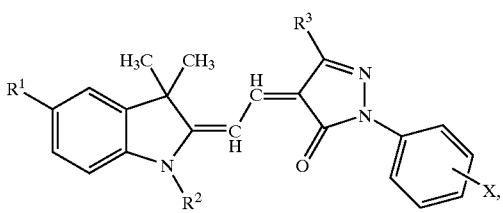

(I)

where

R$^1$ is H, halogen (especially Cl, Br, and F), alkyl (especially C$_1$–C$_6$-alkyl), alkoxy (especially C$_1$–C6-alkoxy), nitro, cyano, sulfonamide (especially SO$_2$NR$^4$R$^5$), COOH, carboxylic ester (especially COOR$^9$, where R$^9$ is C$_1$–C$_6$-alkyl), or carboxamide (especially CONR$^4$R$^5$), R$^2$ is alkyl (especially C$_1$–C$_6$-alkyl), R$^3$ is alkyl (especially C$_1$–C$_6$-alkyl), COOH, carboxylic ester (especially COOR$^9$ where R$^9$ is C$_1$–C$_6$-alkyl), and X is H, halogen (especially Cl, Br, and F), SO$_2$NR$^4$R$^5$, SO$_2$N=CH—R$^6$R$^7$, or SO$_2$R$^8$, where R$^4$ to R$^7$ are independently hydrogen or alkyl (especially C$_1$–C$_6$-alkyl) and R$^8$ is alkyl or hydroxyalkyl (especially hydroxyethylene), comprising reacting compounds of the formulas (II), (III), and (IV)

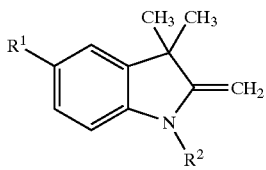

(II)

where R$^1$ and R$^2$ are each as defined above for formula (I),
CH(OR)$_3$ (III)
where R is C$_1$–C$_6$-alkyl (especially methyl), and

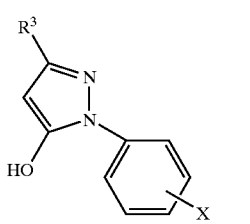

(IV)

where R$^3$ and X are each as defined above for formula (I), with each other in the presence of an organic solvent, preferably an organic solvent selected from the group consisting of dioxane, chlorinated hydrocarbons, chlorobenzene, dichlorobenzene, toluene, xylene, N-methylpyrrolidone, lower alcohols (such as methanol, ethanol, propanols, butanols, pentanols), and glycols (such as ethylene glycol and diethylene glycol) and the corresponding mono- and dialkyl ethers of glycols, most preferably n-butanol.

Organic solvents for the purposes of the present invention are compounds that do not react with the reaction participants or products under the conditions of the condensation reaction.

In a preferred embodiment of the process according to the invention, the molar ratio of the compounds (II):(IV):(III) is in the range from 1:1:1 to 1:1.2:2.0, especially in the range from 1:1:1 to 1:1:1.3.

Any symmetrical condensation products (methine dyes) that are formed are easy to remove.

The process of the invention is preferably carried out at a temperature of 70 to 180° C., especially at 90 to 120° C. For example, the process is carried out under reflux and the resultant alcohol is distilled off in whole or in part, if appropriate. The process may similarly be conducted under superatmospheric pressure in a contained system above the boiling point of the solvent used or of at least one reaction component or of the evolving alcohol HOR.

A condensation reaction for the purposes of this invention is accordingly a reaction in which alcohol is released.

The condensation of the invention proceeds without exception even without further additives. Useful catalysts include basic catalysts, for example, pyridine, piperidine or triethylamine, or acidic catalysts, for example, p-toluenesulfonic acid, hydrochloric acid, sulfuric acid, or carboxylic acids such as, for example, formic acid, acetic acid, or propionic acid.

In a preferred embodiment, about 1 mol of compound (II) (especially 1,3,3-trimethyl-2-methyleneindoline or a derivative thereof) is mixed in butanol with about 1 mol of compound (IV) (especially 5-pyrazolone), admixed with about 1.3 mol of trimethyl orthoformate, and heated in the presence or absence of catalyst (especially in the presence of catalytic amounts of glacial acetic acid) under reflux, with or without distillative removal of methanol, until the components used have been converted. This is followed by cooling, filtration, washing with methanol and water, and drying.

Preference for use as indolines of the formula (II) is given to 1,3,3-trimethyl-2-methyleneindoline, methyl 1,3,3-trimethyl-2-methyleneindoline-5-carboxylate, 1,3,3-trimethyl-5-chloro-2-methyleneindoline, and 1,3,3-triethyl-5-methoxy-2-methyleneindoline. Preference is given to using 1,3,3-trimethyl-2-methyleneindolines substituted in position 5 by substituents such as carboxylic esters, carboxamides, halogen, alkoxy, alkyl, or sulfonamide. Most preference is given to methyl 1,3,3-trimethyl-2-methylenindolinecarboxylate.

Preference for use as compounds of the formula (IV) is given to 1-phenyl-3-methyl-5-pyrazolone, 1-phenylpyrazolone-3-carboxylic esters, and 1-phenylpyrazolones, preferably those in which the phenyl radical is substituted by the sulfonyl radical $SO_2N=CH-N(CH_3)_2$ or $SO_2N(alkyl)_2$.

A preferred compound of the formula (III) is methyl orthoformate.

In a preferred embodiment of the process according to the invention, the reaction mixture is evaporated to dryness and the dry residue is then recrystallized from a suitable solvent. Preferably, the reaction mixture is cooled and filtered, and the filter cake is washed with alcohol and water and subsequently dried.

The process of the invention preferably provides a product mixture preferably containing 90 to 100% (especially 95 to 100%) by weight of the compound of the formula (I) and 0 to 10% (especially 0 to 5%) by weight of the compound of the formula V.

The compound of the formula (V) is the symmetrical condensation product of the compounds of the formulas (II) and (IV) (2 mol equivalents)

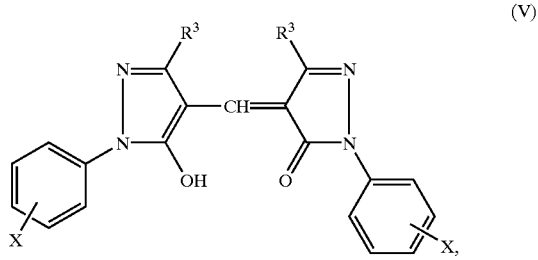

(V)

where $R^3$ and X are each as defined above.

A procedure leading to a particularly high fraction of asymmetrical compound of the formula (I) is preferably washing the filter cake of the reaction mixture with alcohols, for example, butanol or methanol. Particular preference is also given to the use of butanol as a solvent during the condensation reaction.

The invention further provides dye mixtures containing 90 to 99.9% by weight of the dye of the formula (I) and 0.1 to 10% by weight of the dye of the formula (V).

The mixture according to the invention likewise has good properties when used for the mass coloration of plastics.

The invention further provides a process for preparing the mixture of the invention. This is characterized by the same features as the process according to the invention for preparing compounds of the formula (I). Preferably, the compounds (II), (III), and (IV) are reacted in little solvent, preferably in 40 to 70% by weight of solvent, based on the total amount of reactants of the formulas (II), (III), and (IV). Preference is likewise given to washing the resultant filter cake with less methanol. Preference for use as organic solvent for the condensation reaction is given to glacial acetic acid or glycols.

The invention accordingly also provides for the use of the dye mixture according to the invention for the mass coloration of plastics.

The dye mixture according to the invention is very useful for the mass coloration of plastics and produces yellowish orange colorations.

Mass coloration for the purposes of the present invention is especially a process in which the dye is incorporated into the molten plastic material, for example, with the aid of an extruder, or in which the dye is added to starting components for preparing the plastic, for example, to monomers prior to polymerization.

Particularly preferred plastics are thermoplastics, for example, vinyl polymers, polyesters, polyamides, and polyolefins, especially polyethylene and polypropylene, or polycarbonates.

Suitable vinyl polymers include polystyrene, styrene-acrylonitrile copolymers, styrene-butadiene copolymers, styrene-butadiene-acrylonitrile terpolymers, polymethacrylate, and polyvinyl chloride.

Also useful are polyesters such as, for example, polyethylene terephthalates, polycarbonates, and cellulose esters.

Preference is given to polystyrene, styrene copolymers, poly-carbonates, polymethacrylates, and polyamides. Particular preference is given to polystyrene, polyethylene, and polypropylene.

The high molecular weight compounds mentioned may be present singly or in mixtures, as plastically deformable compounds or melts.

The dyes of the invention are preferably used in finely divided form, for which dispersants may but need not be used.

When the dye mixture is added after the polymerization, it is preferably dry mixed or milled with the plastic pellet before this mixture is plasticated and homogenized on mixing rolls or in screws, for example. However, dyes may also be added to the liquid melt and dispersed therein by stirring until homogeneous. The thus precolored material is then further processed as usual, for example by spinning into bristles, filaments, or other spun materials or by extrusion or in the injection molding process, to form shaped articles.

Since the dye mixture is stable to polymerization catalysts, especially peroxides, it is also possible to add the dye to the monomeric starting materials for the plastics and then to polymerize in the presence of polymerization catalysts. To this end, the dye is preferably dissolved or intimately mixed with the monomeric components.

The polymers mentioned are preferably colored with the dye mixture of the invention used in amounts from 0.0001 to 1% by weight (especially 0.01 to 0.5% by weight), based on the polymer quantity.

Pigments that are insoluble in the polymers, for example, titanium dioxide, may be added to obtain corresponding useful hiding coloration. Titanium dioxide may be used in an amount of 0.01 to 10% by weight (preferably 0.1 to 5% by weight), based on the polymer quantity.

The process according to the invention provides transparent or hiding brilliant orange colorations having good heat resistance and good light, weather and sublimation fastness.

The process according to the invention may also utilize mixtures of the dye mixture of the formula (I) according to the invention with other dyes and/or organic or inorganic pigments.

The examples below further illustrate the invention. The invention, which is set forth in the foregoing disclosure, is not to be limited either in spirit or scope by these examples. Those skilled in the art will readily understand that known variations of the conditions of the following procedures can be used. Parts and percentages are by weight.

EXAMPLES

Example 1

46.2 g of methyl 1,3,3-trimethyl-2-methyleneindoline-5-carboxylate were dissolved in 100 ml of n-butanol under nitrogen. 34.8 g of 1-phenyl-3-methyl-5-pyrazolone were added and stirred in for about 10 minutes. After addition of 22.0 g of trimethyl orthoformate and 1 ml of glacial acetic acid, the mixture was refluxed (at 102 to 105° C.) for 5 hours. A further 3 g of trimethyl orthoformate were then added before further refluxing for 10 hours. The batch was cooled down with stirring and subsequently stirred for 2 hours. It was then filtered by applying a vacuum and the filter cake was washed with 200 ml of methanol and then with 500 ml of hot water and dried at 80° C. under reduced pressure.

78.8 g of a dye that is >98.5% the asymmetrical methine dye of the formula 1 below were isolated. The dye gave bold orange mass colorations of plastic (for example, polystyrene). Without glacial acetic acid catalyst, the yield was about 4% lower.

Formula 1

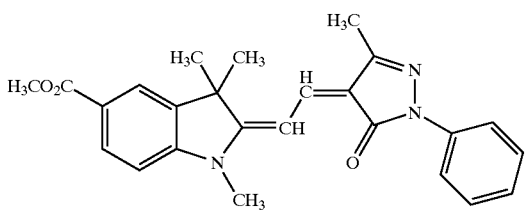

Recrystallization from butanol afforded the dye of formula 1 in pure form in 97% yield.

Example 2

Example 1 was repeated using 41.8 g of 1-phenyl-3-methyl-5-pyrrolidone and 31 g of methyl orthoformate. 85.9 g of a dye mixture containing about 92% of asymmetrical methine dye of the formula 1 and about 8% of the symmetrical methine dye of the formula below were isolated.

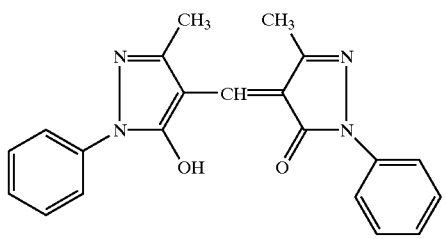

When used for mass coloring plastic (for example, polystyrene), the dye mixture provided a bold orange coloration that, however, is distinctly yellower than that produced by the dye prepared according to Example 1.

Example 3

46.2 g of methyl 1,3,3-trimethyl-2-methyleneindoline-5-carboxylate were dissolved in 100 ml of n-butanol under nitrogen. 61.6 g of pyrazolone were added and stirred in for about 10 minutes.

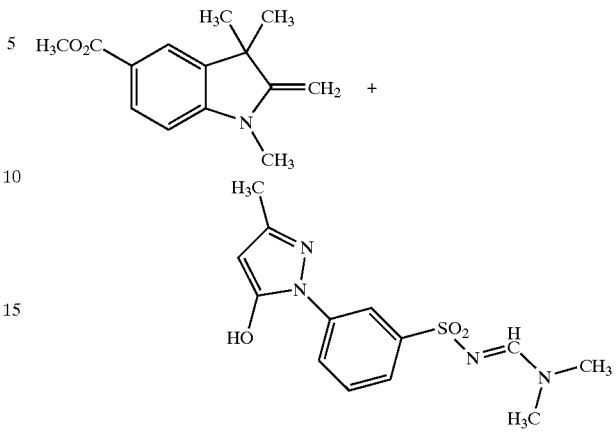

After addition of 22.0 g of trimethyl orthoformate, the mixture was refluxed at (102 to 105° C.) for 5 hours. A further 3 g of trimethyl ortho-formate were then added before further refluxing for 10 hours. The batch was cooled down with stirring and subsequently stirred for 2 hours. It was then filtered by applying a vacuum and the filter cake was washed with 200 ml of methanol and then with 500 ml of hot water and dried at 80° C. under reduced pressure.

Recrystallization from butanol afforded 100.6 g of the dye of the formula 2 (i.e., 91.6% of theory).

Formula 2

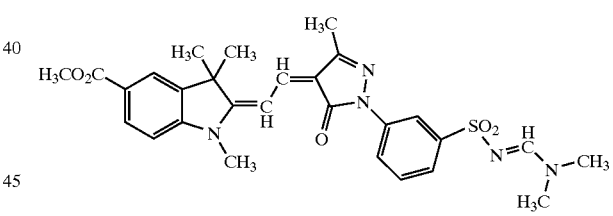

Example 4

46.2 g of methyl 1,3,3-trimethyl-2-methyleneindoline-5-carboxylate were dissolved in 100 ml of ethylene glycol under nitrogen. 37.6 g of pyrazolone were added and stirred in for about 10 minutes.

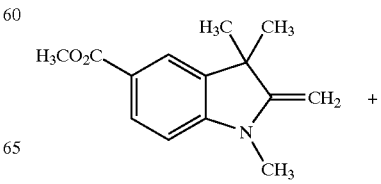

-continued

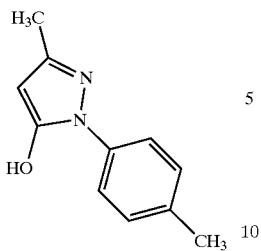

After addition of 22.0 g of trimethyl orthoformate, the mixture was refluxed (at 102 to 105° C.) for 5 hours. A further 3 g of trimethyl ortho-formate were then added before further refluxing for 10 hours. The batch was cooled down with stirring and subsequently stirred for 2 hours. It was then filtered by applying a vacuum and the filter cake was washed with 200 ml of methanol and then with 500 ml of hot water and dried at 800C under reduced pressure.

Recrystallization from butanol afforded 77.0 g of the dye of the formula 3 (i.e., 89.7% of theory).

Formula 3

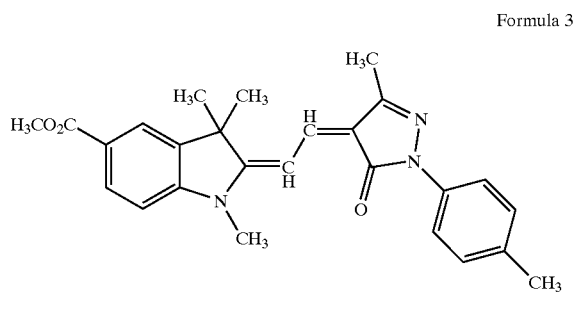

Example 5

46.2 g of methyl 1,3,3-trimethyl-2-methyleneindoline-5-carboxylate were dissolved in 100 ml of n-butanol under nitrogen. 46.4 g of pyrazolone were added and stirred in for about 10 minutes.

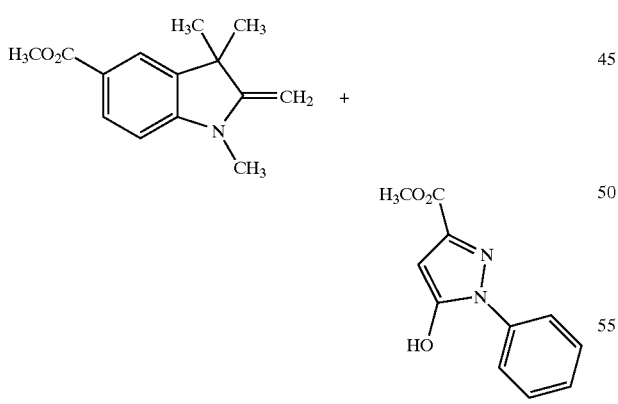

After addition of 22.0 g of trimethyl orthoformate, the mixture was refluxed (at 102 to 105° C.) for 5 hours. A further 3 g of trimethyl ortho-formate were then added before further refluxing for 10 hours. The batch was cooled down with stirring and subsequently stirred for 2 hours. It was then filtered by applying a vacuum and the filter cake was washed with 200 ml of methanol and then with 500 ml of hot water and dried at 80° C. under reduced pressure.

Recrystallization from butanol afforded 88.2 g of the dye of the formula 4 (i.e., 93.2% of theory).

Formula 4

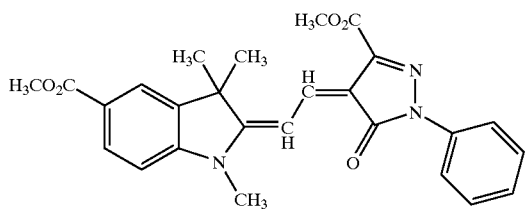

Example 6

40.6 g of 1,3,3-trimethyl-5-methoxy-2-methyleneindoline were dissolved in 100 ml of n-butanol under nitrogen. 46.4 g of pyrazolone were added and stirred in for about 10 minutes.

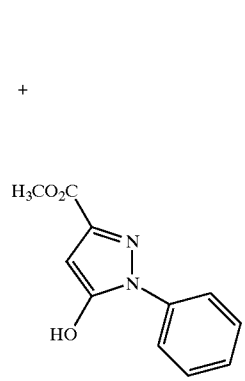

After addition of 22.0 g of trimethyl orthoformate, the mixture was refluxed at (102 to 105° C.) for 5 hours. A further 3 g of trimethyl ortho-formate were then added before further refluxing for 10 hours. The batch was cooled down with stirring and subsequently stirred for 2 hours. It was then filtered by applying a vacuum and the filter cake was washed with 200 ml of methanol and then with 500 ml of hot water and dried at 80° C. under reduced pressure.

Recrystallization from butanol afforded 76.5 g of the dye of the formula 5 (i.e., 86.0% of theory).

Formula 5

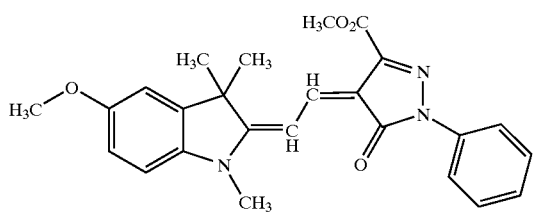

Example 7

41.5 g of 1,3,3-trimethyl-5-chloro-2-methyleneindoline were dissolved in 100 ml of n-butanol under nitrogen. 61.6 g of pyrazolone were added and stirred in for about 10 minutes.

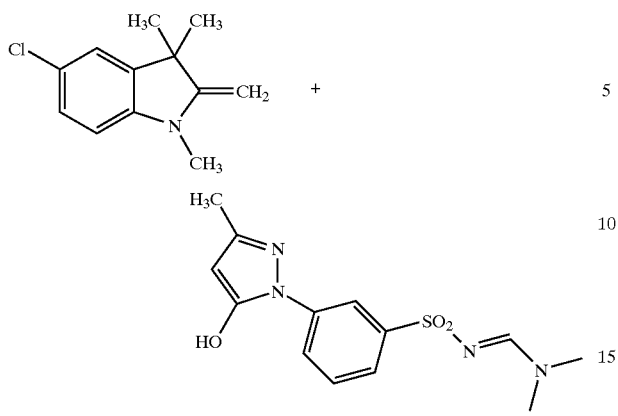

After addition of 22.0 g of trimethyl orthoformate, the mixture was refluxed at (102 to 105° C.) for 5 hours. A further 3 g of trimethyl ortho-formate were then added before further refluxing for 10 hours. The batch was cooled down with stirring and subsequently stirred for 2 hours. It was then filtered by applying a vacuum and the filter cake was washed with 200 ml of methanol and then with 500 ml of hot water and dried at 80° C. under reduced pressure.

Recrystallization from butanol afforded 88.3 g of the dye of the formula 6 (i.e., 84.0% of theory).

Formula 6

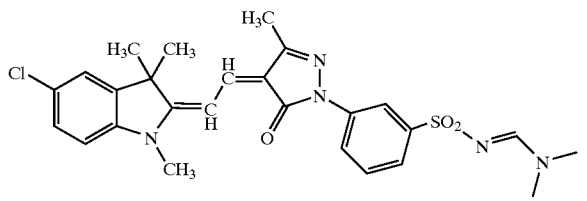

Example 8

41.5 g of 1,3,3-trimethyl-5-chloro-2-methyleneindoline were dissolved in 100 ml of n-butanol under nitrogen. 56.0 g of pyrazolone were added and stirred in for about 10 minutes.

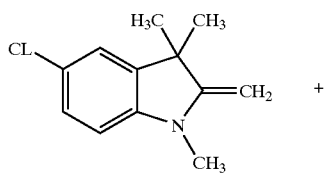

-continued

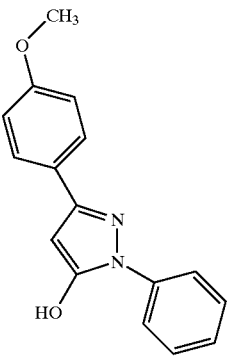

After addition of 22.0 g of trimethyl orthoformate, the mixture was refluxed at (102 to 105° C.) for 5 hours. A further 3 g of trimethyl ortho-formate were then added before further refluxing for 10 hours. The batch was cooled down with stirring and subsequently stirred for 2 hours. It was then filtered by applying a vacuum and the filter cake was washed with 200 ml of methanol and then with 500 ml of hot water and dried at 80° C. under reduced pressure.

Recrystallization from butanol afforded 80.1 g of the dye of the formula 7 (i.e., 82.2% of theory).

Formula 7

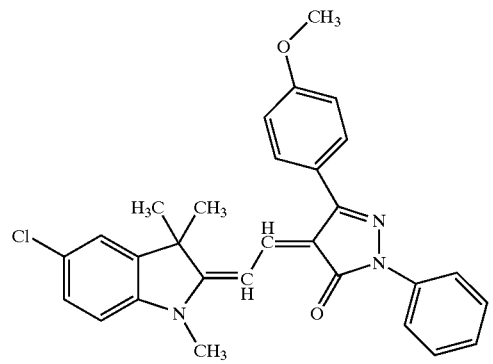

What is claimed is:

1. A process for preparing a compound of the formula (I)

(I)

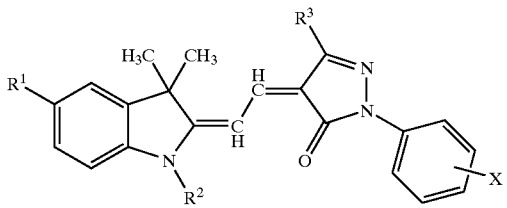

where
$R^1$ is H, halogen, alkyl, alkoxy, nitro, cyano, sulfonamide, COOH, carboxylic ester, or carboxamide,
$R^2$ is alkyl,
$R^3$ is alkyl, COOH, carboxylic ester, and
X is H, halogen, $SO_2NR^4R^5$, $SO_2NCHR^6R^7$, or $SO_2R^8$, where $R^4$ to $R^7$ are independently hydrogen or alkyl, and $R^8$ is alkyl or hydroxyalkyl,
comprising reacting compounds of the formulas (II), (III), and (IV)

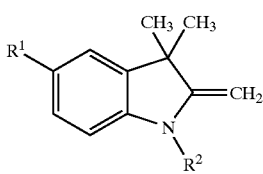
(II)

where R¹ and R² are each as defined above for formula (I),

CH(OR)₃  (III)

where R is $C_1$–$C_6$-alkyl, and

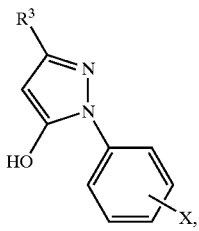
(IV)

where R³ and X are each as defined above for formula (I), with each other in the presence of an organic solvent.

2. A process according to claim 1 wherein the organic solvent is selected from the group consisting of dioxane, chlorinated hydro-carbons, chlorobenzene, dichlorobenzene, toluene, xylene, N-methyl-pyrrolidone, lower alcohols, and glycols and the corresponding mono- and dialkyl ethers of glycols.

3. A process according to claim 1 wherein the molar ratio of the compounds (II):(IV):(II) is in the range from 1:1:1 to 1:1.2:2.0.

4. A process according to claim 1 carried out at a temperature of 70 to 180° C.

5. A process according to claim 1 wherein the compound of formula (I) has the formula

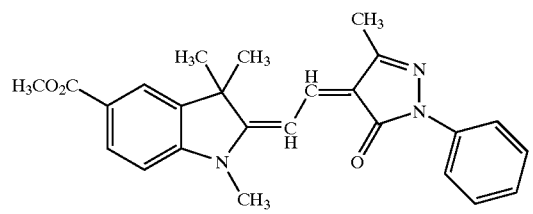

6. A mixture comprising 90 to 99.9% by weight of a compound of formula (I)

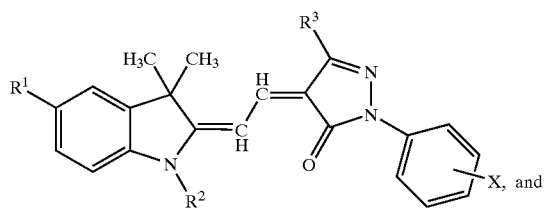
(I)

0.1 to 10% by weight of the compound of the formula V

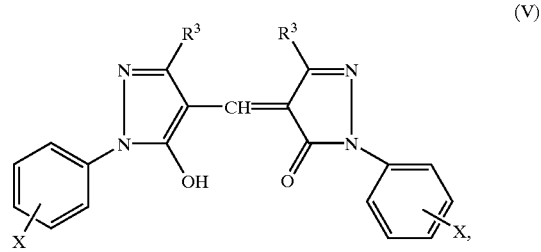
(V)

where
R¹ is H, halogen, alkyl, alkoxy, nitro, cyano, sulfonamide, COOH, carboxylic ester, or carboxamide,
R² is alkyl,
R³ is alkyl, COOH, carboxylic ester, and
X is H, halogen, $SO_2NR^4R^5$, $SO_2NCHR^6R^7$, or $SO_2R^8$, where R⁴ to R⁷ are independently hydrogen or alkyl, and R⁸ is alkyl or hydroxyalkyl.

7. A method for mass coloration of plastics comprising incorporating a mixture according to claim 6 into a plastic.

* * * * *